United States Patent [19]

Hamane et al.

[11] 4,434,945
[45] Mar. 6, 1984

[54] WINDING APPARATUS

[75] Inventors: Tokuhito Hamane, Hirakata; Masaaki Tasai, Kadoma, both of Japan

[73] Assignee: Matsushita Electric Industrial Co., Ltd., Kadoma, Japan

[21] Appl. No.: 347,268

[22] Filed: Feb. 9, 1982

[30] Foreign Application Priority Data

Feb. 19, 1981 [JP] Japan ................... 56-24110

[51] Int. Cl.³ ............... B65H 59/00; D01H 7/24
[52] U.S. Cl. ................... 242/7.14; 242/47; 242/82; 57/115; 57/352; 140/92.1
[58] Field of Search ............ 242/7.14, 75.5, 82, 242/151, 156.2, 4 BE, 47; 57/115, 117, 352; 140/92.1

[56] References Cited

U.S. PATENT DOCUMENTS

| | | | |
|---|---|---|---|
| 2,727,353 | 12/1957 | Vibber | 57/115 X |
| 2,814,925 | 12/1957 | Vibber | 57/115 X |
| 2,909,341 | 10/1959 | Kingsley | 242/151 |
| 3,156,324 | 11/1964 | Colbert | 242/151 X |

Primary Examiner—Stuart S. Levy
Assistant Examiner—David Werner
Attorney, Agent, or Firm—Wenderoth, Lind & Ponack

[57] ABSTRACT

An improved winding apparatus for winding wires and the like, which includes a flyer having a passage for passing the wire through it and driven for rotation around a winding form or winding frame for winding the wire onto the winding form, a roller movably mounted on the flyer for movement in approximately radial direction from a rotational axis of the flyer so as to depress the wire disposed approximately along a direction parallel to rotational axis of the flyer, by a centrifugal force during rotation of the flyer, and biasing members for urging the roller towards the rotational axis of the flyer against the centrifugal force, so that the tension for the wire may be increased during high speed rotation of the flyer.

3 Claims, 4 Drawing Figures

WINDING APPARATUS

BACKGROUND OF THE INVENTION

The present invention generally relates to a winding arrangement, and more particularly, to a winding apparatus for electric wires and the like, which is equipped with a device for properly adjusting tension applied to a wire, during winding of the wire continuously discharged through a nozzle of a flyer member and wound onto a winding form or winding frame, and which may be particularly employed as part of a manufacturing arrangement, for example of coils of electric rotary machines, etc.

Referring first to FIG. 1 showing a conventional winding apparatus, constructions and functions of a flyer and a tension applying device incorporated therein will be described hereinbelow.

In FIG. 1, the winding apparatus generally includes the tension applying device T for adjusting the tension of a wire 3 wound on a bobbin 4 and passed through said device T, and a wire passage 5 in the form of a tube for leading the wire 3 from the tension applying device T towards the flyer 1 through a main body 15 of the winding apparatus. The flyer 1 is provided with guide rollers 12 and 13 incorporated therein for further guiding the wire 3 into a nozzle portion 14 formed at a distal end of one of a pair of flyer arms 1a extending downwardly from opposite end portions of a flyer base 1b, with said flyer 1 being arranged to be rotated around a winding form or winding frame 2 by a shaft S extending from a motor M to the flyer base 1b through the main body 15 of the winding apparatus and a boss portion B as shown for winding the wire 3 fed out through the nozzle portion 14 onto the winding form 2.

The tension applying device T further includes guide members 7, 10 and 11 accommodated in a housing Ta in spaced relation from each other. Each of the guide members 7, 10 and 11 has an opening for passing the wire 3 therethrough, while the guide member 7 supported on a base 9 and the guide member 10 are each formed with other sets of openings provided to surround the wire passing openings thereof for passing therethrough a tension applying thread 6 which is twisted together between the members 7 and 10 for imparting a tension to the wire 3 in a manner as described later. Accordingly, the wire 3 paid out from the bobbin 4 is led through the guide members 11, 10 and 7 and the twisted portion of the thread 6, and further, the wire passage 5, and then, guided by the rollers 12 and 13 so as to be fed out through the nozzle portion 14 and wound onto the winding form 2 as the flyer 1 rotates.

In the above arrangement, for winding the wire 3 onto the winding form 2, it is generally required to apply a tension to the wire 3. For this purpose, it is so arranged that the wire 3 is squeezed by further twisting the thread 6 through turning of the guide member 7 by loosening a bolt 8 which secures said guide member 7 normally in position. In the above state, the tension thus imparted is actually measured by a tensiometer or the like as the wire 3 is drawn out from the nozzle 14, and upon application of a sufficient squeezing equivalent to a proper tension to the wire 3, the guide member 7 is fixed in position by tightening the bolt 8. For altering the tension to be imparted, the bolt 8 is again loosened, and the guide member 7 is rotated to alter the degree of twisting of the thread 6, with subsequent re-tightening of the bolt 8.

However, in the conventional practice as described above, there is a disadvantage that, since the distance ranging from the thread 6 to the winding form 2 is considerably long, the wire 3 is kept stretched or elongated for a long period of time while it is passing therebetween, thus resulting in an increase in its elongation. Therefore, in the conventional method, it has been impossible to fully meet the demand for minimizing the elongation of the wire from the viewpoints of characteristics and manufacturing technique, for example, as required in coils for electric motors, etc.

When a smooth regular winding is particularly required for winding the wire 3 onto the winding form 2, it is necessary to impart a certain predetermined tension to the wire 3. However, in general, since the winding form 2 does not have a circular cross section, the speed of the wire 3 to be fed out during one rotation is varied to a large extent, while a marked variation is also noticed in the speed at which the end of the winding is paid out from bobbin 4.

In the conventional arrangements, when the speed at which wire is paid out is suddenly raised in the above-described manner, since the wire 3 is abruptly pulled while being held by the thread 6, a large tension is exerted thereon, while on the contrary, upon rapid reduction in the speed, the wire is brought into a sagged state while being held by the thread 6, with a consequent rapid reduction in the tension. In other words, in the conventional winding apparatuses, it has been impossible to apply a constant tension. Moreover, for altering the tension to be applied, it has been necessary to make adjustments so as to achieve the required tension by actually measuring the tension through alterations of the degree of twisting of the thread 6 on a trial and error basis.

OBJECTS AND SUMMARY OF THE INVENTION

Accordingly, an essential object of the present invention is to provide a winding apparatus for electric wires, etc., which is capable of applying a proper tension to the wire and the like to be wound in an efficient manner, with substantial elimination of disadvantages inherent in the conventional apparatuses of this kind.

Another important object of the present invention is to provide a winding apparatus of the above described type which is simple in construction and accurate in functioning at high reliability, and can be readily manufactured at low cost.

In accomplishing these and other objects, according to one preferred embodiment of the present invention, there is provided a winding apparatus for winding wires and the like, which includes a flyer member having a passage for passing the wire therethrough and driven for rotation around a winding form or winding frame for winding the wire onto the winding form, a roller member movably mounted on the flyer member for movement in approximately radial directions from a rotational axis of the flyer member so as to depress the wire disposed approximately along a direction parallel to the rotational axis of the flyer member, by a centrifugal force during rotation of the flyer member, and biasing means for urging the roller member towards the rotational axis of the flyer member against the centrifugal force, so that the tension for the wire may be increased during high speed rotation of the flyer member.

By the arrangement according to the present invention as described above, an improved winding apparatus for winding electric wires and the like has been advantageously presented through simple construction and at high reliability for efficient winding operations.

BRIEF DESCRIPTION OF THE DRAWINGS

These and other objects and features of the present invention will become apparent from the following description of the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE PREFERRED EMBODIMENT

Figure 1:
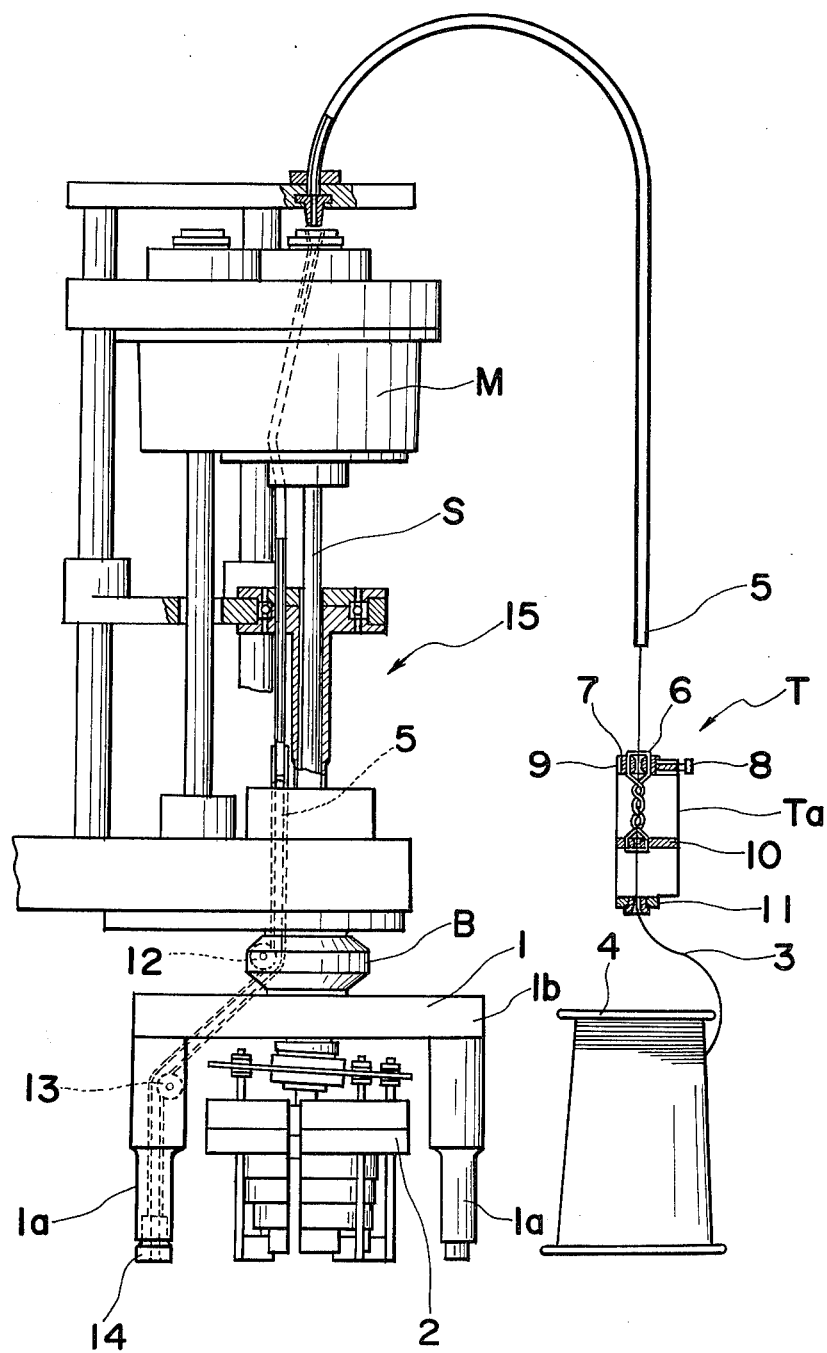
FIG. 1 is a side elevational view, partly in section, of a conventional winding apparatus showing the relation between a tension applying device and a flyer thereof (already referred to)
Figure 2:
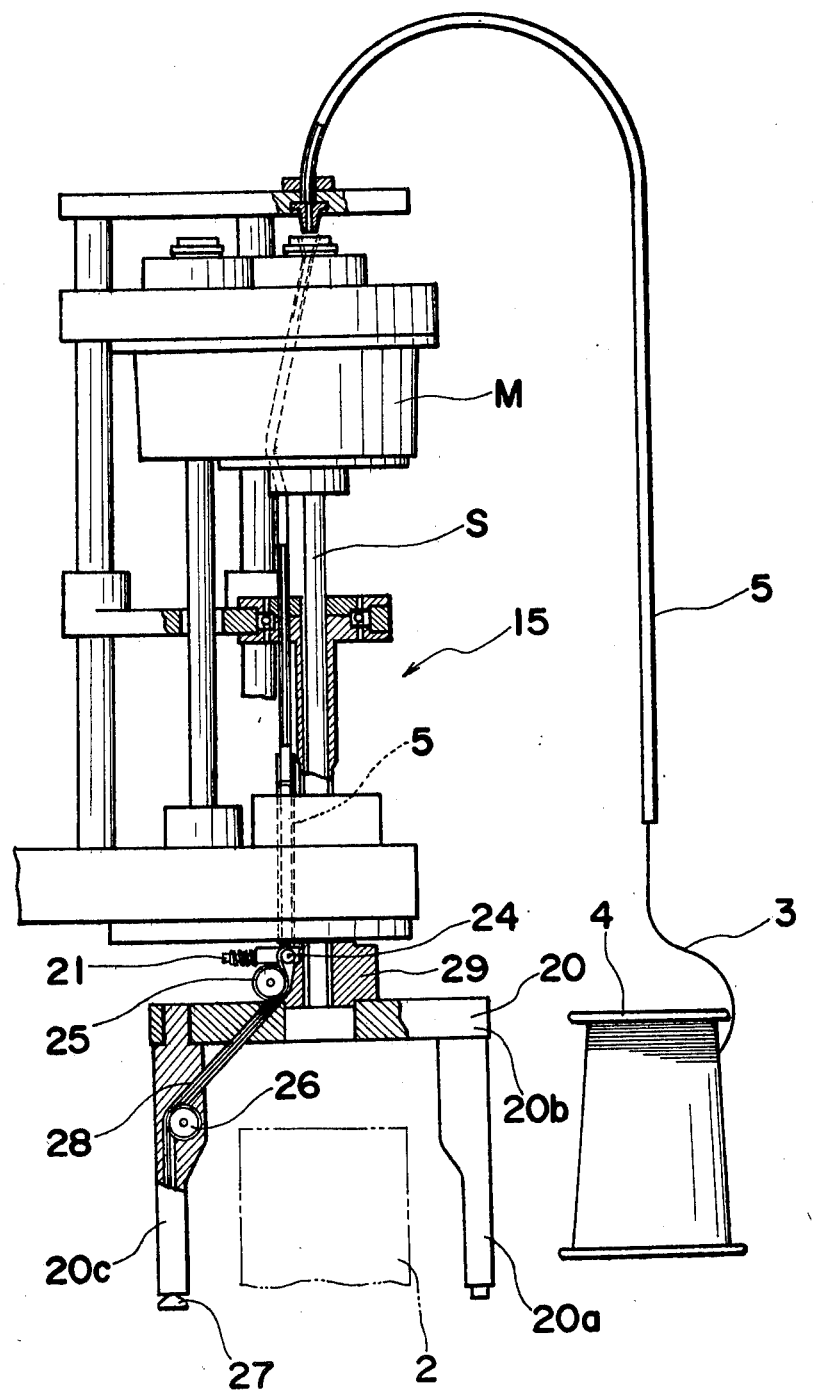
FIG. 2 is a side elevational view, partly in section, showing a general construction of a winding apparatus according to one preferred embodiment of the present invention.

Referring now to the drawings, there is shown in FIG. 2, a winding apparatus for electric wires and the like according to one preferred embodiment of the present invention, in which the tension applying device T described as employed in the conventional winding apparatus of FIG. 1 is dispensed with, and an improved tension applying arrangement is mainly incorporated into a flyer portion 20 of the apparatus in a manner as described hereinbelow.

It should be noted here that, since the present invention is mainly directed to the improvements at the flyer portion, like parts of the winding apparatus of FIG. 1 are denoted by like reference numerals, with detailed description thereof abbreviated here for brevity.

Figure 3:
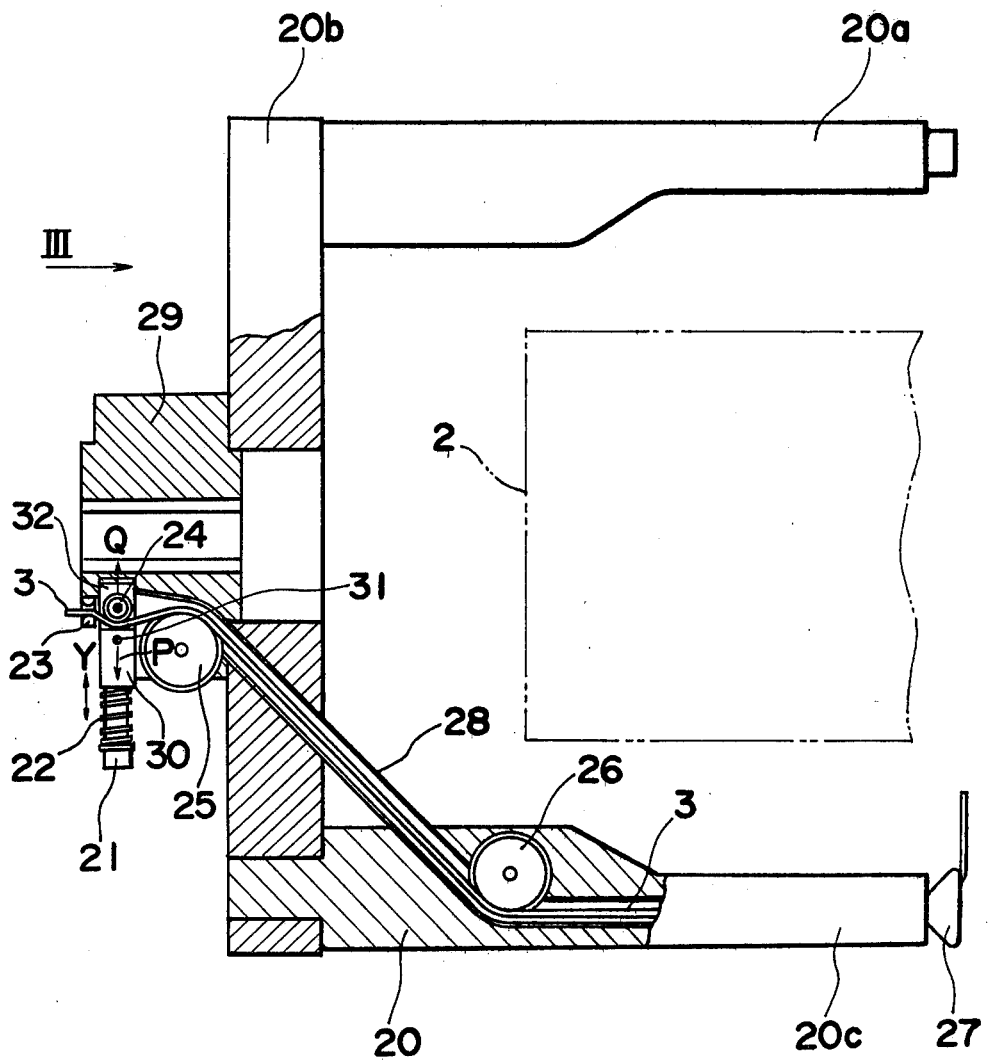
FIG. 3 is a side elevational view, partly in section, showing, on an enlarged scale, the flyer portion of the winding apparatus of FIG. 2.
Figure 4:
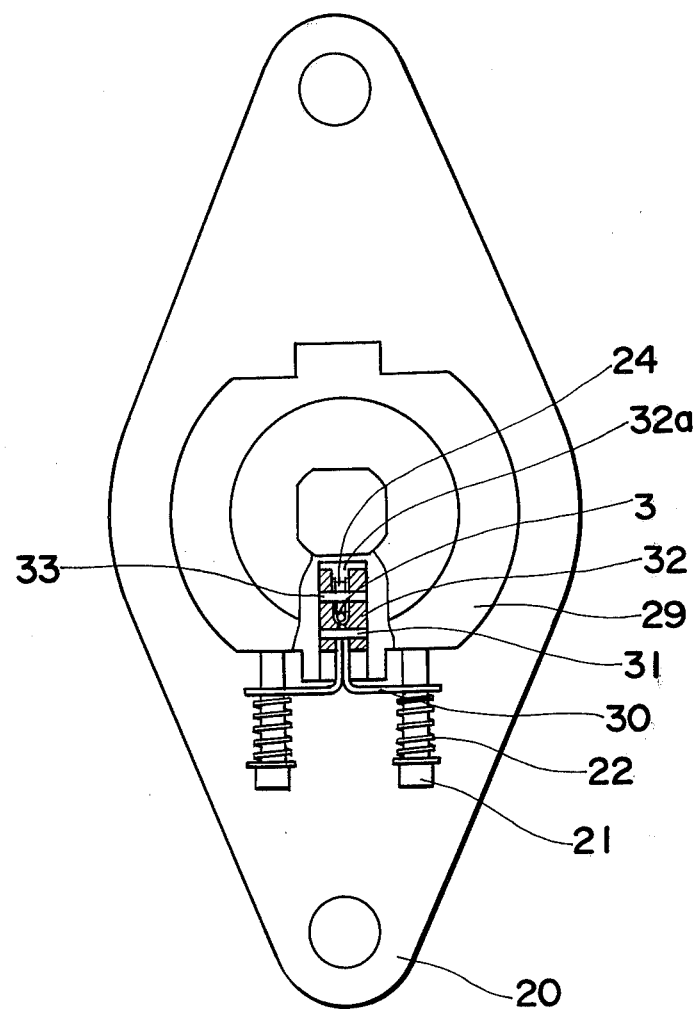
FIG. 4 is a top plan view, partly in section, of the flyer portion of FIG. 3 as observed in the direction of an arrow III.

Referring also to FIGS. 3 and 4, the flyer portion 20 generally includes a flyer base 20b, a pair of flyer arms 20a and 20c extending downwardly (i.e. laterally towards the right in FIG. 3) from opposite ends of the flyer base 20b, a boss portion 29 secured at an approximately central portion of the base 20b for receiving the shaft S connected to the motor M for rotating the flyer 20 as described with reference to FIG. 1, bolts 21 respectively threaded into the boss portion 29 (FIG. 4), biasing members 22, for example, in the form of coil springs each provided around the bolts 21 in a manner as described later, a guide member 23 provided in the base portion 20b for guiding the wire 3, rollers 24, 25 and 26 rotatably mounted in the boss portion 20b annd one arm 20c of the flyer 20 along a wire passage 28 which leads to the wire passage 5 extending through the main body 15 of the winding apparatus, so as to contact the wire 3 for leading said wire 3 out of the flyer 20 through a nozzle 27 provided at the end of the flyer arm 20c and communicated with the wire passage 28.

In the above embodiment, the tension applying device T described as employed in the conventional apparatus of FIG. 1 is replaced by the improved tension applying arrangement which is constituted by the roller 24, biasing members 22, bolts 21, a bracket 30, a pin 31 and a slider 32. More specifically, the bolts 21 are respectively threaded into the boss portion 29 through openings (not shown) formed in the bracket 30, while the biasing members 22 in the form of coil springs are disposed between the bracket 30 and the head portions of the bolts 21 (FIG. 4) for limiting the movement of the bracket 30 in the direction of the arrow P in FIG. 3 against the centrifugal force during rotation of the flyer 20. The bracket 30 is mounted on the slider 32 by a pin 31, and the roller 24 is rotatably mounted in a groove 32a formed in the slider 32 through a rod 33. Consequently, the roller 24 may be regarded as movably supported in a direction approximately perpendicular to the longitudinal direction of the wire 3 as indicated by the arrows Y in FIG. 3.

The wire 3 which is fed from the bobbin 4 via the wire passage 5 extending through the main body 15 of the winding apparatus passes through the guide 23, outer peripheries of the rollers 24 and 25, wire passage 28, and outer periphery of the roller 26, and is fed outside the flyer 20 through the nozzle portion 27.

It should be noted that the tension applying device of the present invention as described in the foregoing is arranged to apply and control the tension to the wire 3 by controlling the amount of detouring of the wire 3 by the roller 24.

During rotation of the flyer 20, the slider 32 is moved so that the centrifugal force exerted on the slider 32, rod 33, roller 24, pin 31 and bracket 30, the force applied by the wire 3 to push back the roller 24, and the force exerted by the biasing members 22, are balanced in their sum. More specifically, when the tension for the wire 3 tends to increase upon rapid increase of the discharge amount of the wire 3, the roller 24 moves in the direction indicated by the arrow Q in FIG. 3 for supressing the increase of tension. On the contrary, when the amount of discharge of the wire 3 decreases, the roller 24 moves in the direction indicated by the arrow P in FIG. 3 for increasing the tension, and thus, the tension to be applied to the wire 3 is maintained approximately constant.

Although the tension required for winding the wire 3 onto the winding form 2 is increased as the number of revolutions of the flyer 20 becomes larger, the centrifugal force exerted onto the slider 32, rod 33, roller 24, pin 31 and bracket 30, is increased with the increase in the number of revolutions of the flyer 20, with the roller 24 moving in the direction of the arrow P against the urging force by the biasing members 22, and thus, the tension applied to the wire 3 is increased for balancing.

As is clear from the foregoing description, according to the arrangement of the present invention, since the tension is applied to the wire within the flyer, with the distance up to the winding form being extremely short as compared with that in the conventional tension applying devices, the elongation of the wire may be extremely reduced, while owing to the automatic increase of the tension, with the increase of the number of revolutions of the flyer, it has been made possible to provide the optimum tension at all times.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A winding apparatus for winding wires and the like around a winding form, said apparatus comprising:
   a flyer member having a wire passage for passing a wire therethrough onto the winding form, rotatable about a rotational axis, said flyer member including a boss portion; and
   means for applying tension to the wire by a centrifugal force during rotation of said flying member, said tension applying means including:
      a slider member slidably supported on said flyer member for sliding movement in a radial direction with respect to said rotational axis,
      a roller member, rotatably mounted on said slider for rotative contact with the wire and for radial movement with said slider,
      a bracket member having radially extending openings therein,
      a pin fixing said bracket member to said slider member for radial movement therewith,
      bolt members fixed at one end to said boss portion, extending through said openings in said bracket member and having head portions opposite said one end, and
      coil springs surrounding said bolts between said bracket member and said head portions so as to urge said roller member through said bracket member and slider member toward said rotational axis against said centrifugal force.

2. A winding apparatus as in claim 1, wherein said flyer member includes an arm having a nozzle portion at one end thereof and means, disposed along said wire passage, for guiding the wire into said nozzle portion so as to feed the wire out of said flyer member onto the winding form and wind the wire about the winding form as the flyer member rotates about said axis of rotation.

3. A winding apparatus as in claim 1, wherein said bolt members have threaded ends screwed into said boss portion and said tension applying means includes a rod for rotatably mounting said roller member on said slider.

* * * * *